Patented Sept. 10, 1935

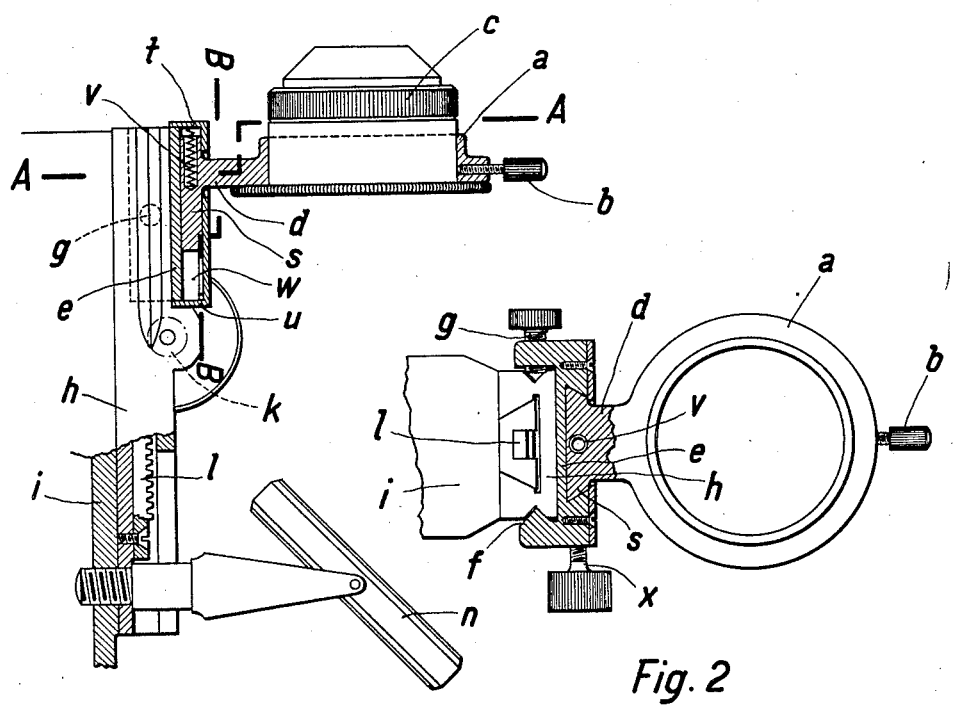
Fig. 1
Fig. 2
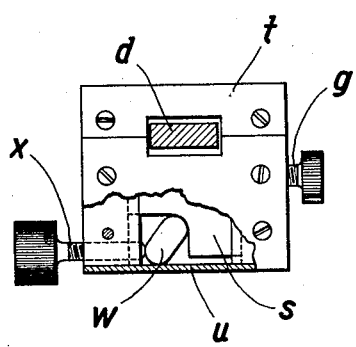
Fig. 3

2,014,161

UNITED STATES PATENT OFFICE 2,014,161

SUBSTAGE FOR MICROSCOPIC CONDENSERS AND THE LIKE

Walther Bauersfeld, Jena, Germany, assignor to firm Carl Zeiss, Jena, Germany

Application May 8, 1935, Serial No. 20,407
In Germany May 11, 1934

2 Claims. (Cl. 88—40)

The device for illuminating objects under microscopic examination is generally a condenser attached to the microscope stand by means of a substage. To provide that the condenser can be easily exchanged for another, the substage is in most cases displaceable in a slide guide along the stand, in the direction of the axis of the illumination rays, this displacement being effected generally by means of a gear, for instance a rack and pinion. This gear is also to effect those small displacements which are necessary, for instance, when object slides of different thicknesses are used and the point of intersection of the illumination rays is to be so adjusted as to lie in the focusing plane. The gear, which is meant especially for coarse adjustment, is not fine enough when the demands upon accuracy of the latter kind of adjustment are very exacting.

The present invention, which aims at overcoming this disadvantage, concerns such substages for condensers and other microscopic accessory devices as are attached to a microscope by means of a slide coarsely adjustable in the direction of the axis of the illumination rays and as are easily removable from the said slide. Contrary to this attachment of a substage, which is generally effected by means of two parts detachably interconnected, the substage according to the present invention has the means for an easily detachable connexion of two parts not rigidly connected to the means for the connexion of the microscopic accessory device but displaceably connected to each other through the agency of a gear for fine adjustment parallel to the direction of displacement of the said slide guide. Accordingly, the substage consists of three different parts. The performance of coarse adjustments of the microscopic accessory device is left to the known gears, and that of the fine adjustments is effected by a special fine focusing gear. It has proved to be especially simple and convenient to use as a fine focusing gear a loosely disposed and inclined pressure body actuated by a spring and inclinable by means of a pressure screw.

The accompanying drawing represents a constructional example of the invention. Figure 1 illustrates this example in central elevational section, and Figures 2 and 3 show sections through the lines A—A and B—B, respectively, of Figure 1.

The substage according to the constructional example has a ring $a$ provided with a clamping screw $b$ which is to hold a microscope condenser $c$. To the ring $a$ is connected by means of a lateral rod $d$ a holder $e$ whose cross-sectional area has the shape of a U. The one of the U-shanks of the holder $e$ is provided with a rod $f$ in the form of a roof whose roof edge is parallel to the axis of the ring $a$. Into the other U-shank a screw $g$ having a conical end is so screwed that this end protrudes over the interior surface of the shank and that the axis of the said screw intersects the roof edge of the rod $f$ at right angles.

The substage serves the purpose of attaching the microscope condenser $c$ to an illumination slide $h$ of a microscope stand $i$. The slide $h$ is displaceable up and downwardly along the stand $i$ by means of a rack $l$ and a pinion $k$. The lateral surfaces of the slide $h$ have triangular grooves which are parallel to the direction of displacement of the slide $h$ and extend from the upper end of this slide $h$ to the housing $m$ of the pinion $k$. Below the rack $l$ a rotatable illumination mirror $n$ is screwed to the stand $i$. A slide $s$ is connected to the rod $d$. In a slide guide of the holder $e$, the slide $s$ is displaceable parallel to the axis of the condenser $c$. Sheets $t$ and $u$ of angle iron are screwed to the ends of the holder $e$. A spring $v$ acting against the upper sheet $t$ presses the slide $s$ downwardly against an inclined longitudinal pressure body $w$ which lies against the lower sheet $u$ and a pressure screw $x$ displaceable in the holder $e$.

When the substage is to be used, the screw $g$ is unscrewed so far until its point does not protrude over the interior surface of the holder $e$ any longer, the rod $f$ is introduced sidewardly into the corresponding groove in the slide $h$, the substage is rotated about the roof edge of the rod $f$ until the holder $e$ lies against the slide $h$, and the screw $g$ is screwed into the groove in the slide $h$, the lower end of the holder $e$ resting against the housing $m$ of the pinion $k$. Subsequently to the slide $h$ having been raised so far that the microscope condenser $c$ protrudes into the aperture in the object stage, the condenser $c$ is finely adjusted by rotating the screw $x$. This rotation of the screw $x$ entails a variation of the inclination of the pressure body $w$, and the slide $s$ is slightly displaced against the pressure of the spring $v$.

I claim:

1. A substage for condensers and other microscopic accessory devices, consisting of a part in the form of a slide, this part being adapted to attach the substage for coarse displacement to a microscope stand, the lateral exterior surfaces of this part being provided with recesses, means for attaching a microscopic accessory device, other means, these other means being adapted to attach the first said means to the said part, the first said means being parallel to the direction of displacement of the said part and displaceably disposed in the said other means, these other means being in the form of a U, the interior surfaces of the two shanks of this U-shaped means being provided with projections corresponding to the said recesses, the height of at least those projections which are in the one of the said shanks being variable, and a fine focusing gear, this fine focusing gear connecting the first said means to the said other means.

2. In a substage according to claim 1, the said fine focusing gear consisting of a longitudinal pressure body, this pressure body being inclined and loosely disposed between the first said means and the said other means, a pressure spring for varying the inclination of the said pressure body, the one end of the said pressure body resting against the end of the said pressure spring and against the first said means, the one end of this pressure spring resting against the said other means, and the first said means resting against the other end of the said pressure spring and against the other end of the said pressure body.

WALTHER BAUERSFELD.